United States Patent [19]

Frederiksen

[11] Patent Number: 4,715,219

[45] Date of Patent: Dec. 29, 1987

[54] ACOUSTIC CALIBRATION DEVICE

[75] Inventor: Erling Frederiksen, Holte, Denmark

[73] Assignee: Aktieselskabet Bruel & Kajaer, Naerum, Denmark

[21] Appl. No.: 891,218

[22] Filed: Jul. 28, 1986

[30] Foreign Application Priority Data

Sep. 23, 1985 [DK] Denmark .............................. 4310/85

[51] Int. Cl.$^4$ ..................... G01H 17/00; G01M 19/00; G01D 21/00

[52] U.S. Cl. .................................... 73/1 DV; 367/13; 73/1 R

[58] Field of Search ................ 73/1 DV, 1 R; 367/13

[56] References Cited

U.S. PATENT DOCUMENTS

| | | | |
|---|---|---|---|
| 2,394,613 | 2/1946 | Houlgate et al. | 367/13 X |
| 2,597,005 | 5/1952 | Kendall | 367/13 X |
| 3,281,543 | 10/1966 | Clay et al. | 73/1 DV X |
| 3,327,071 | 6/1967 | Bonk | 73/1 DV X |
| 3,744,294 | 7/1973 | Lewis et al. | 367/13 X |
| 3,930,216 | 12/1975 | Hall, Jr. | 73/1 DV X |
| 4,039,767 | 8/1977 | Leschek | 367/13 X |
| 4,043,176 | 8/1977 | Graham | 73/1 DV |

FOREIGN PATENT DOCUMENTS 3395-83  7/1983  Denmark .

OTHER PUBLICATIONS

*Acoustical Engineering;* pp. 424–427; by Harry F. Olson; pub. 1957 by D. Van Nostrand Co., Inc., of Princeton, N. J.

"The Measurement of Sound Intensity"; Report No. 28, The Acoustics Laboratory, Technical University of Denmark; 1980, 89 pages, Finn Jacobsen.

"Electroacoustic Measuring Equipment and Techniques"; *Proceedings of the IRE,* vol. 50, No. 5, May 1962, pp. 762–768; Leo L. Beranek.

"Calibration and Free-Field Evaluation of a Pressure--Gradient Microphone"; *The Journal of the Acoustical Society of America;* vol. 34, No. 11, pp. 1779–1786; Nov. 1962; G. B. Thurston et al.

*Primary Examiner*—Tom Noland
*Attorney, Agent, or Firm*—Scully, Scott, Murphy & Presser

[57] ABSTRACT

An acoustic calibration device for intensity measuring systems comprising at least two pressure microphones to be calibrated without using an anechoic chamber. The calibration device comprises at least two cavities interconnected by means of one or several acoustic resistance elements. One of the pressure microphones is to be inserted into one of the cavities and the second pressure microphones is to be inserted into the second cavities. A sound source is connected to one of the cavities. In connection with the subsequent cavity the acoustic resistance thus forms an acoustic RC-link providing a phase shift proportional to the frequency corresponding to the conditions in the free field. By a suitable dimensioning of the RC-link a phase shift corresponds to the phase shift over a distance of e.g. 50 mm in the free field. The sound source is able to generate either white noise or pink noise depending on whether measurements are performed over fixed frequency intervals or relative frequency intervals.

11 Claims, 7 Drawing Figures

ACOUSTIC CALIBRATION DEVICE

FIELD OF THE INVENTION

The present invention relates to an acoustic calibration device for intensity measuring systems comprising at least two pressure microphones.

BACKGROUND ART

Measuring microphones have been extensively used for measuring sound pressures. In many acoustic tests it has, however, been more expedient to measure the sound intensity, which is a vector size, rather than the sound pressure, which is scalar size. The sound intensity of a sound source is definable e.g. by integrating the sound intensity over a surface surrounding the sound source, in which no anechoic chamber will be needed. Even a strong background noise will not affect the measuring results detrimentally, as the sound sources outside the surrounding surface of integration do not contribute to the integrated sound intensity.

Intensity measuring is often based on a two-microphone-technique, e.g. as described by Finn Jacobsen in report No. 28, 1980, from the Technical University of Denmark, Acoustic Laboratory: "Measurements of Sound Intensity". Briefly, the method is based on the approximation that the intensity vector in a stationary sound field in a specific point is equal to the temporal average value of the product between the instantaneous pressure and the corresponding particle velocity in the same point, and that the vector of the particle velocity can be deduced from the sound pressure gradient in the point. This pressure gradient is approximately equal to the difference in pressure between two points located at a small distance from the reference point divided by the distance between the two measuring points.

A condition of the method being applicable in practice, and particularly at low frequencies, is that the two pressure microphones match extremely well, especially with respect to their phase characteristics, if measuring errors should be avoided.

SUMMARY OF THE INVENTION

It is the object of the present invention to indicate how pressure microphones may be calibrated without using an anechoic chamber, and according to the invention this object is obtained by means of a calibration device which is characterized by comprising two cavities, which are interconnected by means of one or several acoustic resistance elements, one of the pressure microphones being insertable into one of the cavities and the remaining pressure microphones being insertable into one of the remaining cavities, and a sound source being connected in the said one cavity. In connection with the subsequent cavity the acoustic resistance thus forms an acoustic RC-link providing a phase shift proportional to the frequency, and this corresponds to the conditions in the free field. At a suitable dimensioning of the RC-link a phase shift is obtained corresponding to the phase shift over a distance of e.g. 50 mm in the free field. The sound source concerned can either generate white noise or pink noise depending on whether measurements are performed over fixed frequency intervals or relative frequency intervals.

The acoustic resistance may e.g. be composed of a laminated construction consisting of radially extending lamellae led out to a circumferential cavity with evenly dispersed openings, the acoustic resistance only being changeable by removal of one or several lamellae.

As a result it is comparatively easy to adjust the acoustic resistance with a desirable accuracy.

The fact that the acoustic resistance element also has a certain mass reactance can advantageously be utilized, a more uniform sound pressure in the two chambers of the coupler over a frequency area thereby being obtainable.

BRIEF DESCRIPTION OF THE DRAWING

The invention will be described more detailed below with reference to the accompanying drawing where like reference numerals in different figures refer to indentical elements, in which.

DESCRIPTION OF THE PREFERRED EMBODIMENTS

Previously only indirect or relatively inadequate methods were used for calibrating intensity measuring systems comprising several microphones.

According to the invention an acoustic calibrator is provided which in connection with a pressure microphone-based intensity measuring system is capable of simulating a well-defined intensity.

The calibrator consists of a coupler and one or several sound sources. Irrespective of the source used, the coupler will shift the phase between its two acoustic signals proportional to the frequency, as it is the case between two points in a free field.

The coupler may e.g. be adapted to provide a phase shift corresponding to the phase shift over a distance of 50 mm in a free field.

In practice a comparatively good result can be obtained over about 5 octaves (20 Hz to 640 Hz) concurrently with the modules of the two pressures of the coupler being of approximately the same size.

The coupler may e.g. be used in connection with an acoustic sound source emitting a pink noise (−3 dB/octave) between about 20 Hz and 5 kHz. The residual intensity-index of a measuring system may be controlled by means of such a source. The measurements are furthermore so simple that they can be performed on the measuring spot. Alternatively, a sound source with discrete frequencies, e.g. a pistonphone, may be used.

Figure 1:
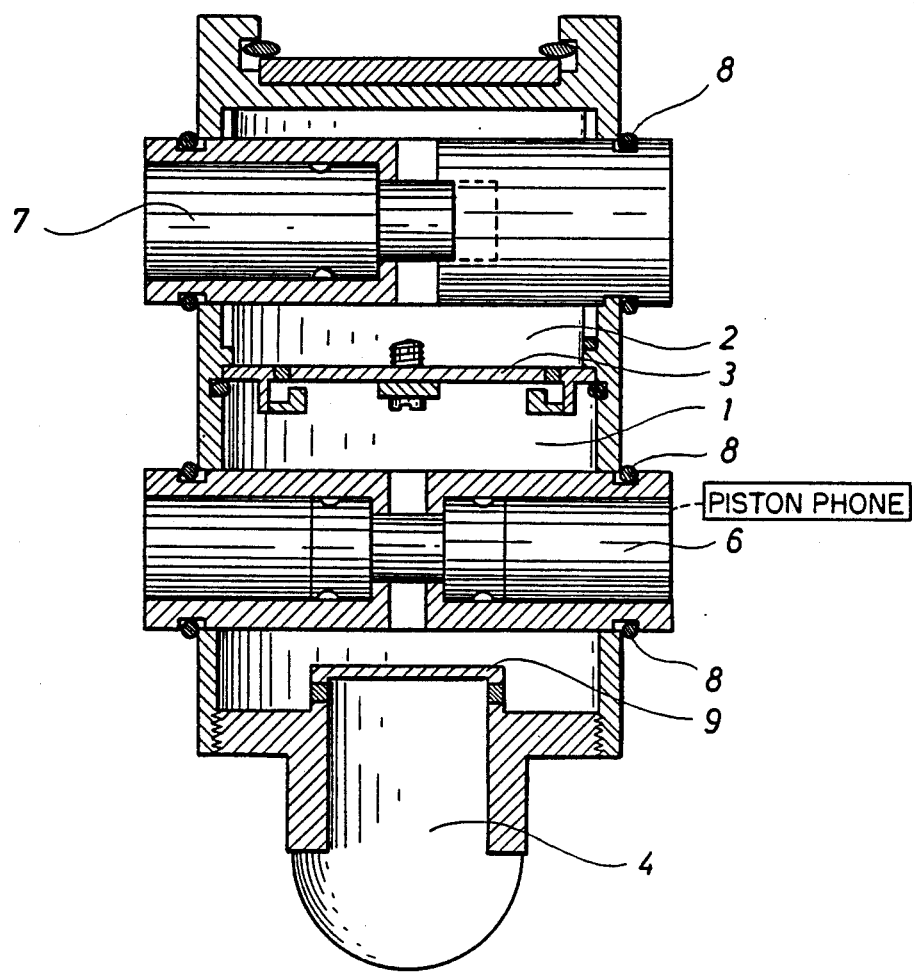
FIG. 1 illustrates a calibration device for intensity measuring systems comprising at least two pressure microphones.
Figure 2:
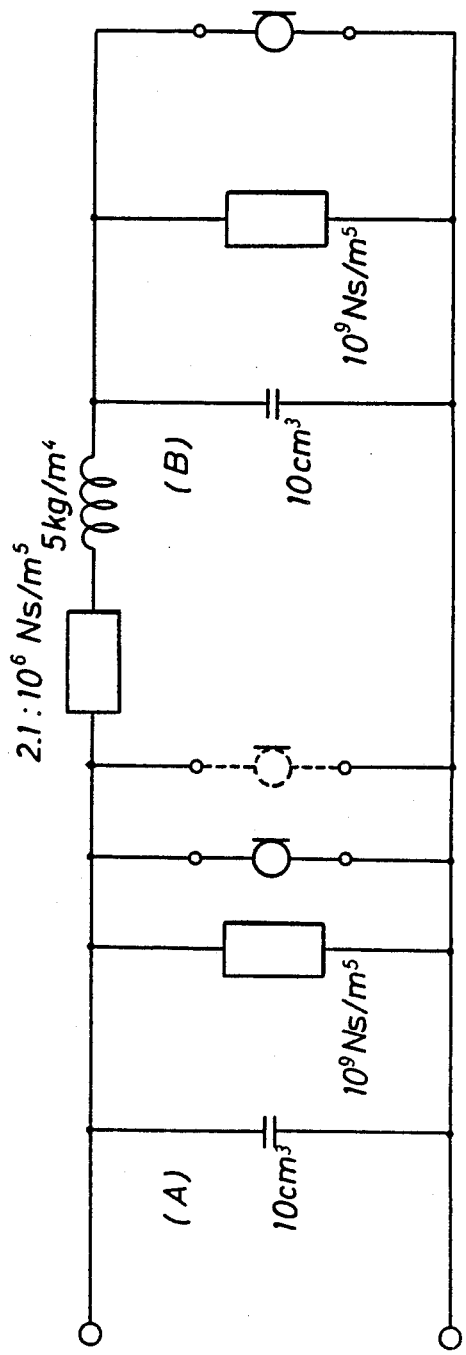
FIG. 2 illustrates an equivalent circuit model of the calibration device.
Figure 3:
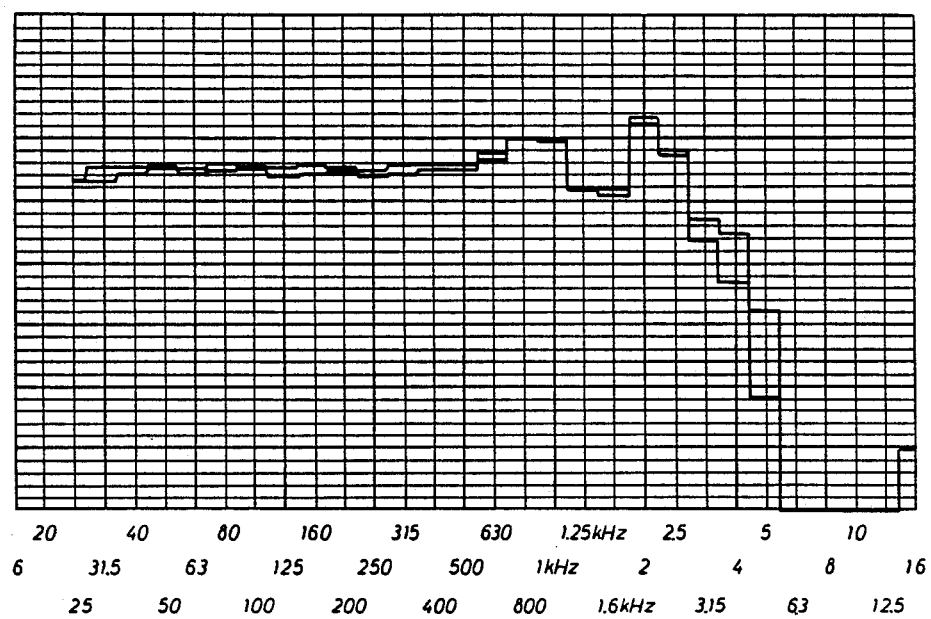
FIG. 3 is the pressure as function of the frequency.

The coupler comprises two cavities 1, 2 interconnected by means of an acoustic resistance 3—cf. FIG. 1. The sound source 4 is connected to the first cavity 1, from where the sound propagates through the resistance 3 to the second cavity 2. The sound pressure in the second cavity 2 will then be phase shifted proportional to the frequency, and the module of the pressure in the second cavity 2 will for small phase shifts in practice be equal to the pressure in the first cavity 1. A model of the coupler—cf. FIG. 2—has been assembled, which provides for the said parameters and also provides for leakage in the two cavities, for acoustic mass in the resistance element and for the thermal effect of the inner surfaces of the two cavities, i.e. the passage between the adiabatic and the isothermic compression process in the cavities.

This model illustrates that only the resistance 3 will in practice be critical at for example 250 Hz, which is an ideal frequency for intensity simulation.

For measuring the residual intensity the two microphones are placed opposite each other in a cavity. Only the membranes—and not the pressure equalizing channels—are exposed to the sound pressure.

Figure 5:
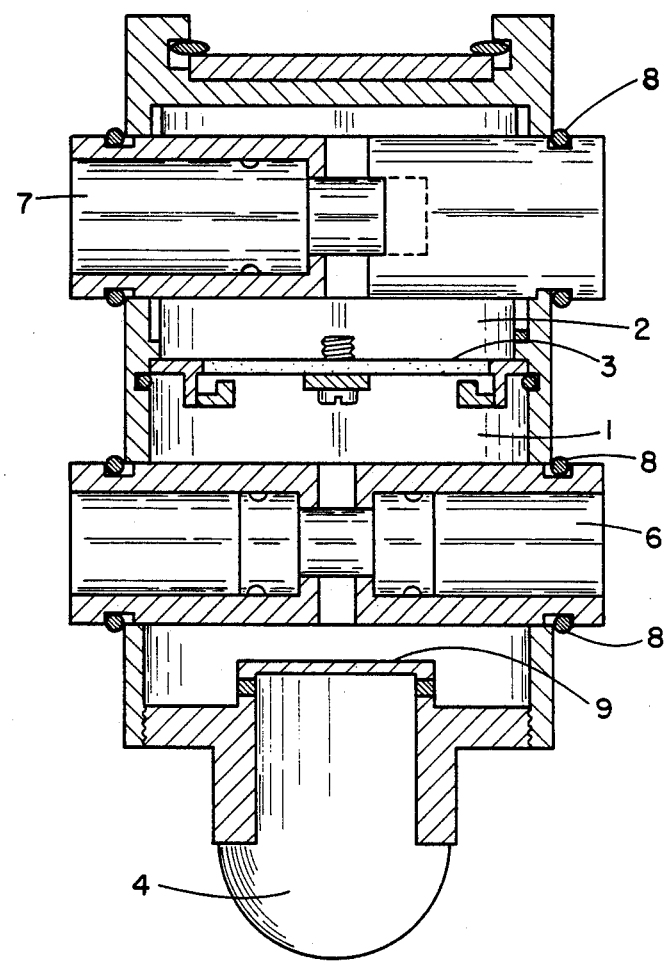
FIG. 5 illustrates a calibration device similar to the device of FIG. 1 and having a sintered acoustic resistance.

Turning to FIG. 5, sintered acoustic resistances 3' of e.g. stainless steel may be used. To simulate a distance between the microphones of 50 mm in a free field the total resistance should amount to $2\times 10^6 Ns/m^5$ for a cavity of about 10 cm$^3$.

Figure 6:
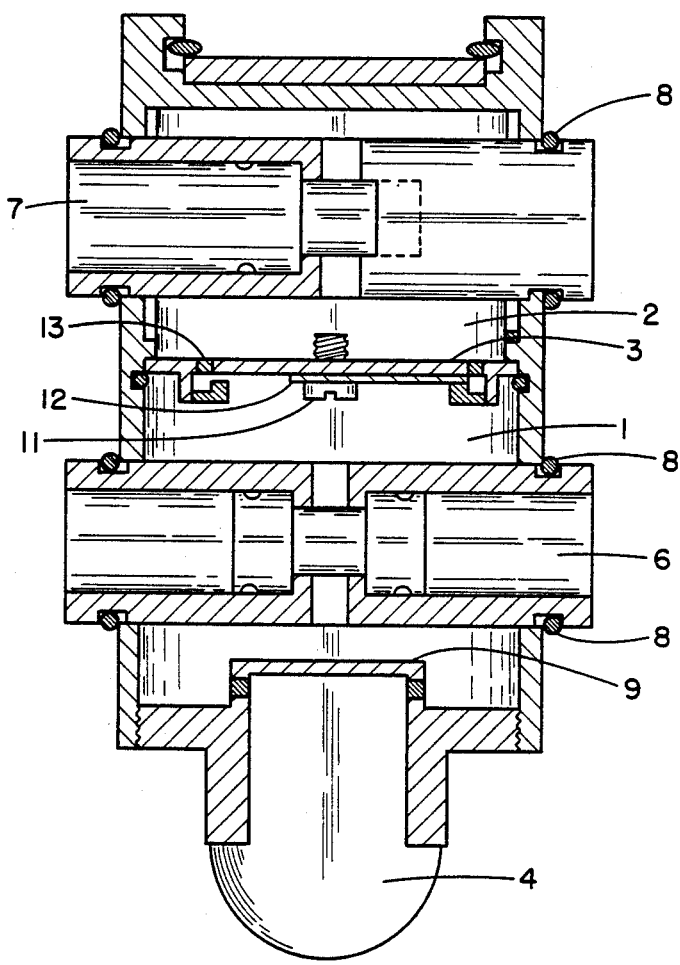
FIG. 6 illustrates a calibration device similar to the device of FIG. 1 and having an acoustic resistance composed of radially extending lamellae.
Figure 7:
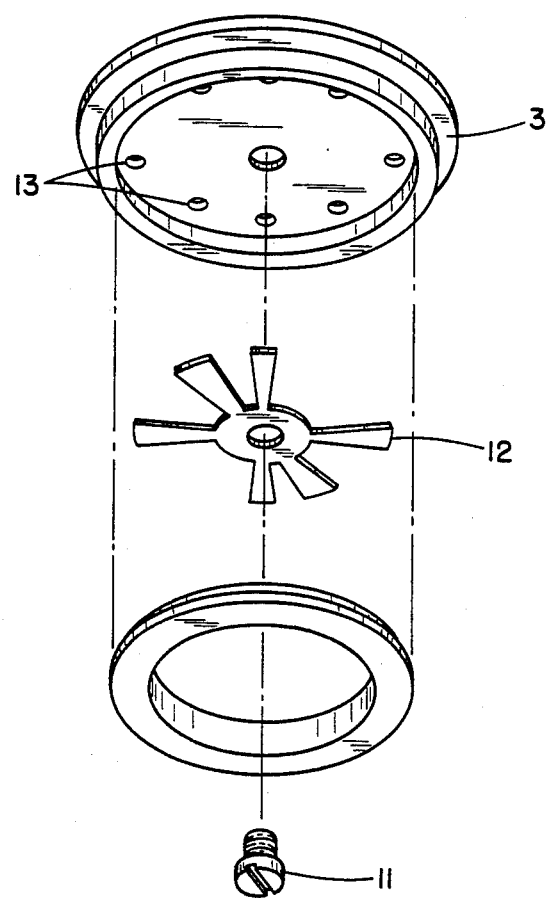
FIG. 7 is a partial exploded perspective view of the radial lamellae construction of the device of FIG. 6.

FIGS. 6 and 7 show laminated constructions may alternatively be used composed of radially extending lamellae 12 led out to a circumferential groove of a circumferential cavity with evenly dispersed openings 13, the acoustic resistance $\Delta R$ only being changeable by removal of one or several lamellae.

As the microphones are not completely symmetrical around their axes with respect to sensitivity (module and phase), a sound field is provided in the coupler, which is as symmetrical as possible on the spots where the microphones are placed opposite each other.

Calibration of the Coupler

By means of two random microphone channels a phase angle is measured with one microphone in the first cavity 1 and the second microphone in the second cavity 2. The microphones are thereafter interchanged between the two cavities 1, 2 and the phase angle is again measured.

By a suitable optimization of the measuring equipment the phase angle $\Phi$ can be measured with an accuracy of considerably less than 0.1° or less than 0.5% of the 13.11° which is nominal for 50 mm at 250 Hz.

The pressures $P_1$ and $P_2$ in the coupler are measured in relation to the pressure at the source 4, whereafter simulated particle velocity V and intensity I can be calculated according to the formulae $$V = \sqrt{\frac{\left[(P_1 - P_2) \cdot \cos\frac{\Phi}{2}\right]^2 + \left[(P_1 + P_2) \cdot \sin\frac{\Phi}{2}\right]^2}{\omega \cdot \rho \cdot \Delta R}}$$

$$I = \frac{P_1 \cdot P_2 \cdot \sin \Phi}{\omega \cdot \rho \cdot \Delta R}$$

the frequency $\omega$ is also measured during the calibration.

In connection with calibration of an intensity measuring equipment by means of the coupler the coupler will within wide limits shift the phase proportional to the frequency, and the frequency of the sound source will consequently not be critical. The level of the particle velocity and intensity is not affected by changes of frequency in the sound source 4.

The assembled model has furthermore been used for analyzing the influence of the static pressure. It has turned out that the coupler used together with the sound source in question is capable of simulating a constant intensity in relation to a measuring system measuring correctly at the current static pressure. The sound pressure will, however, be proportional to the static pressure.

The Influence of the Temperature

The temperature only influences the calibrator through a small change of the viscosity of the air. The resistance between the chambers changes and results in small amendments of the calibration signal. Nevertheless the simulated velocity and the intensity is changed to some degree, as the conditions of the sound field to be simulated are changed.

In a definite embodiment the calibration device is constructed as illustrated in the sectional view of FIG. 1. The sound generator 4 placed at the bottom is adapted to transmit a sound signal received by the microphone 6 placed in the first cavity 1 and the microphone 7 placed in the second cavity 2, respectively. The cavities 1, 2 are separated by an acoustic resistance in such a manner that a phase shift proportional to the frequency is obtained. The device may e.g. be sealed by means of O-rings 8. The diameter of the device may e.g. be about 35 mm. The plate 9 disperses the sound pressure from the sound source.

Figure 4:
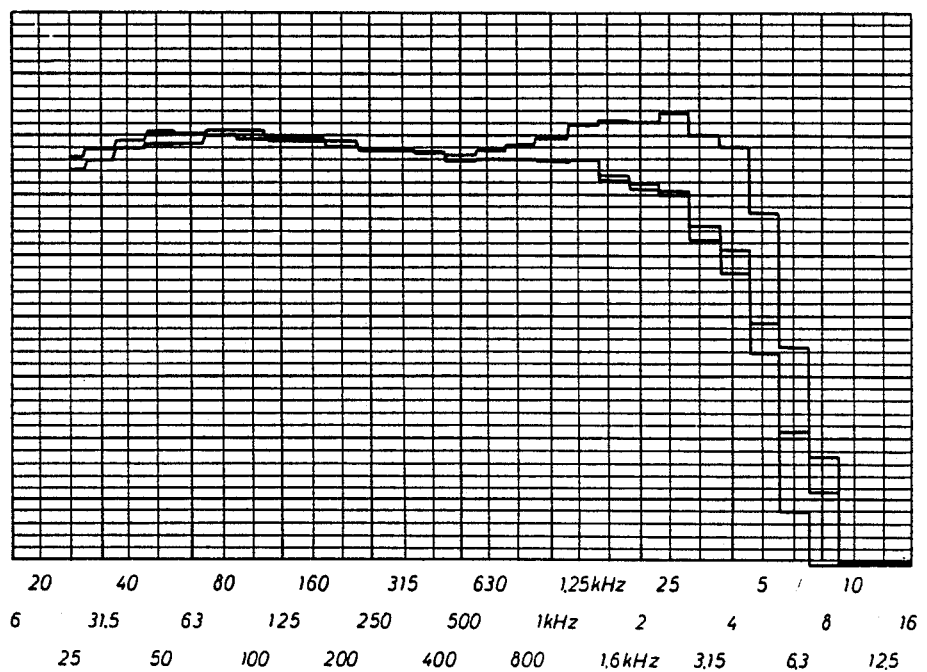
FIG. 4 is the pressure as function of the frequency, a resistance element with less mass reactance being used.

The smaller self-induction in connection with the acoustic resistance can advantageously be utilized, as the calibrator can thereby be used within a broader frequency interval—cf. FIG. 4.

A calibration device applicable on the measuring spot is also provided according to the invention. The device is comparatively simple in construction and easily calibrated by means of a pistonphone.

The calibration device according to the invention can also be used for calibration and pressure microphone-based equipment for measuring particle velocity.

When using the device for measuring residual intensity-index the microphones are located in the same chamber.

I claim:

1. An acoustic calibration device for intensity measuring systems comprising at least two pressure microphones (6,7) and at least two cavities, wherein the cavities are interconnected by means of at least one acoustic resistance element (3), one of the pressure microphones (6) being insertable into one of the cavities (1) and the remaining pressure microphones (7) being insertable into one of the remaining cavities (2), and a sound source being connected in the said one cavity.

2. A calibration device as claimed in claim 1, characterized in that the sound source (4) is adapted to generate white noise.

3. A calibration device is claimed in claim 1, in that the sound source (4) is adapted to generate a pink noise.

4. A calibration device as claimed in claim 1, characterized in that the acoustic resistance is composed of stainless steel.

5. A calibration device as claimed in claim 1, characterized in that the acoustic resistance is composed of sintered acoustic resistances.

6. A calibration device as claimed in claim 1, characterized in that the acoustic resistance is composed of a laminated construction.

7. A calibration device as claimed in claim 6, characterized in that the laminated construction is composed of radially extending lamellae led out to a circumferential cavity with evenly dispersed openings, the acoustic resistance being changeable by removal of one or more lamellae.

8. A calibration device as claimed in claim 1, characterized in that the device during the assembling is sealed by means of sealing rings (8).

9. A calibration device as claimed in claim 1, characterized by being calibrated by means of a pistonphone.

10. A calibration device as claimed in claim 1, characterized in that the device during assembling is sealed by means of elastic O-rings.

11. A calibration device as claimed in claim 1, characterized in that a plurality of acoustic resistance elements interconnect the cavities.

* * * * *